Figure 1:
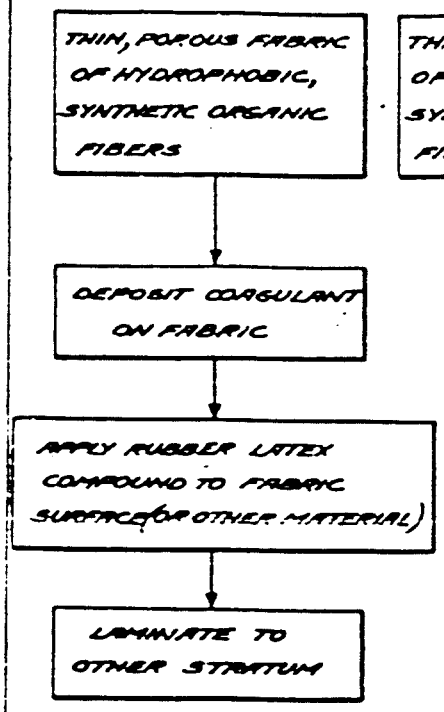
Figure 2:
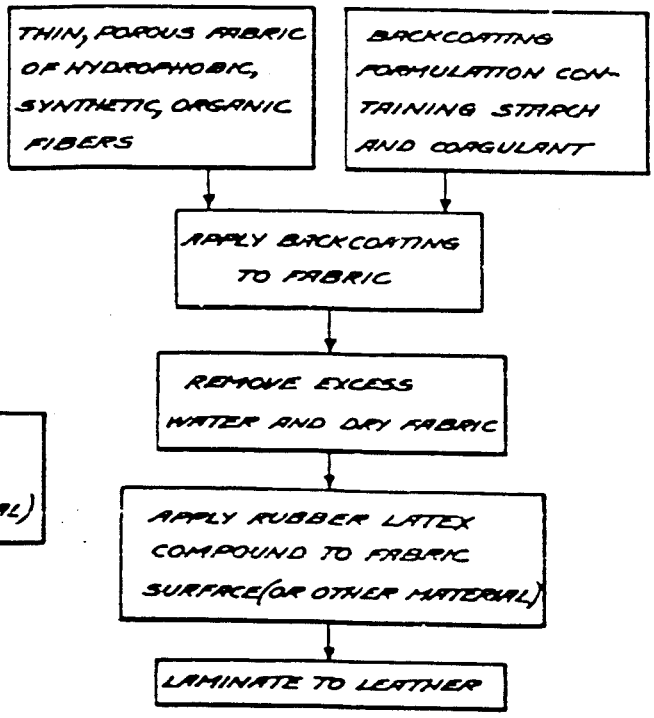

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 7, 1969

858 O.G. 42

T 858 006

631,449

PROCESS AND PRODUCT OF LAMINATING WITH A LATEX AND LATEX COAGULANT

William C. Dodson, Jr., Wilmington, Del., assignor to E. I. du Pont de Nemours and Company, Wilmington, Del., a corporation of Delaware

Filed Apr. 17, 1967. Published Jan. 7, 1969

Class 161—82

1 Sheet Drawing. 34 Pages Specification

Novel coagulant-carrying fabrics are laminated by a process for bonding two or more materials including the steps of (A) depositing a water-soluble latex coagulant solid selected from the group consisting of aluminum sulfate, potassium aluminum sulfate, sodium aluminum sulfate, ammonium aluminum sulfate, citric acid, oxalic acid, ammonium chloride and salts of barium, calcium, tin and zinc in a surface layer of a fabric that is at least about 0.004-inch thick in an amount of from about 2 to about 15% by weight of said layer, said fabric being a thin, porous fabric having a thickness of at least about 0.004-inch and being made of hydrophobic, synthetic organic fibers; (B) applying an adhesive formulation primarily comprising an aqueous rubber latex to the surface of one of said materials in an amount of from about 2 to about 20 grams of adhesive per square foot of interface between said materials; and (C) then immediately contacting said adhesive-coated material with the other material.

T858006

631449